(12) United States Patent
McGregor

(10) Patent No.: US 6,982,375 B2
(45) Date of Patent: Jan. 3, 2006

(54) MUSICAL TEACHING DEVICE AND METHOD

(76) Inventor: Rob McGregor, 6342 Forest Hill Blvd., West Palm Beach, FL (US) 33415

( * ) Notice: Subject to any disclaimer, the term of this patent is extended or adjusted under 35 U.S.C. 154(b) by 0 days.

(21) Appl. No.: 10/457,147

(22) Filed: Jun. 6, 2003

(65) Prior Publication Data

US 2004/0244564 A1 Dec. 9, 2004

(51) Int. Cl.
*G09B 15/08* (2006.01)

(52) U.S. Cl. .................. 84/478; 84/477 R; 84/467; 84/468; 84/469; 84/465

(58) Field of Classification Search ............... 84/478, 84/477 R, 467, 468, 469, 465
See application file for complete search history.

(56) References Cited

U.S. PATENT DOCUMENTS

| | | | |
|---|---|---|---|
| 4,204,455 A | 5/1980 | Harrington | |
| 4,635,516 A | 1/1987 | Giannini | |
| 4,769,881 A | 9/1988 | Pedigo et al. | |
| 4,920,848 A | 5/1990 | Suzuki | |
| 5,046,394 A | 9/1991 | Suzuki et al. | |
| 5,082,258 A * | 1/1992 | Niks | 84/469 |
| 5,151,553 A | 9/1992 | Suzuki et al. | |
| 5,184,319 A | 2/1993 | Kramer | |
| 5,392,682 A * | 2/1995 | McCartney-Hoy | 84/470 R |
| 5,631,861 A | 5/1997 | Kramer | |
| 5,638,831 A | 6/1997 | Brown | |
| 6,032,530 A | 3/2000 | Hock | |
| 6,042,555 A | 3/2000 | Kramer et al. | |
| 6,059,506 A | 5/2000 | Kramer | |
| 6,162,981 A * | 12/2000 | Newcomer et al. | 84/485 R |
| 6,262,355 B1 | 7/2001 | Koch | |

FOREIGN PATENT DOCUMENTS

| | | | |
|---|---|---|---|
| JP | 200089754 | * | 3/2000 |
| JP | 2000089754 A | | 3/2000 |

* cited by examiner

*Primary Examiner*—Shih-Yung Hsieh
(74) *Attorney, Agent, or Firm*—McHale & Slavin, P.A.

(57) ABSTRACT

A musical teaching device has a carriage to be placed in juxtaposition with a piano keyboard. The carriage has a pair of gloves slidably attached to move along the length of the carriage. The fingers of the gloves include signaling devices to indicate proper movement. The carriage and gloves are connected to a controller that commands proper hand positioning and finger movement to play a musical score loaded in the controller. The controller is powered by a computer program.

6 Claims, 5 Drawing Sheets

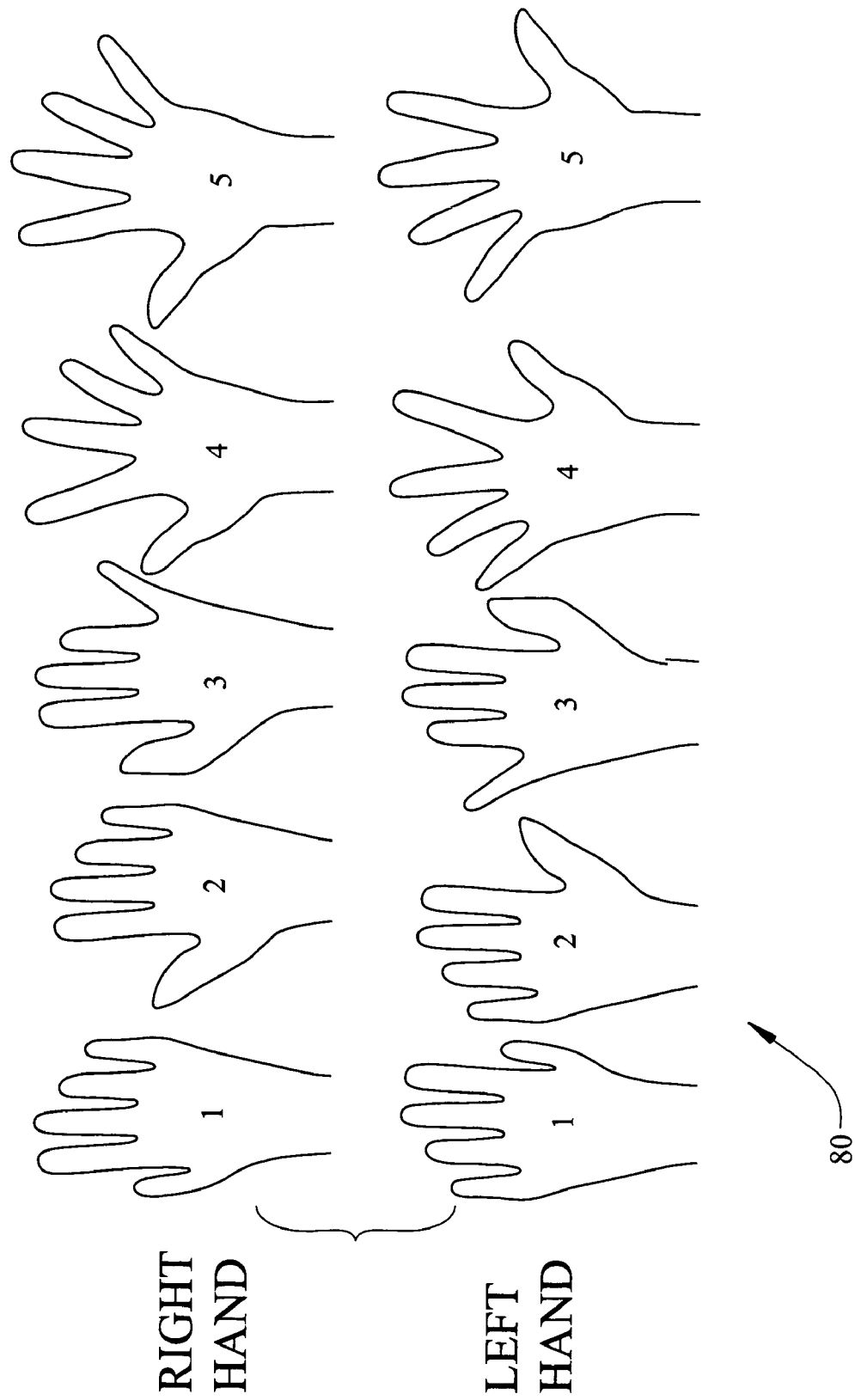

MUSICAL TEACHING DEVICE AND METHOD

FIELD OF THE INVENTION

This invention relates to teaching a subject to play a musical instrument and, particularly, to a musical instrument accessory to stimulate the subject in a musically programmed sequence of movements on the instrument.

BACKGROUND OF THE INVENTION

Historians recognize Bartolommeo Cristofori as having invented the piano during the early 1700's. However, use of a finger keyboard which functions to create sounds, dates back to approximately the year 1350 when such a keyboard was added to an instrument called the psaltery. The instrument resulting from the addition of the keyboard to the psaltery became known as the harpsichord. The keyboard used throughout history has remained virtually unchanged to modern times. Today, modern pianos, harpsichords, and even technology's most cutting edge electronic instruments employ virtually the same keyboard that was developed in the 1300's.

The playing of music on a keyboard instrument by a subject human being requires the subject to perform numerous simultaneous motor-skills and thought processes, not the least of which is the proper striking of the various keys at the proper time(s), in the proper sequence and rhythms. Additionally, the timing, speed, pressure and velocity by which certain keys are struck is also an integral component in the process. The process of playing a keyboard instrument also requires the ability to read the printed musical 'grand-staff,' recognizing which notes on the staffs correspond with the proper keys on the keyboard and the order by which each key is struck, and which fingers should be used to strike each key. All of these components are a learned skill which, historically, has required that the subject learn each facet separately, until eventually, the subject is able to put each skill together in concert, through repetitive practicing, hopefully resulting in the subject playing the keyboard and creating music.

The learning process could be greatly abbreviated if the subject had use of an apparatus by which the motor-skill component of the learning process could be assisted by means of the apparatus mechanically 'teaching' each of the subject's 10 fingers which keys to strike, in the proper sequence and timing by the apparatus manipulating the subject's fingers directly on the keyboard. Furthermore, the ability to automatically associate the notes on the printed staff with the corresponding keys on the keyboard in concert with the mechanical manipulating of the subject's fingers would also abbreviate the learning time of that component of the learning process. Recently, electrical devices have been used in training a subject to move in a certain way. Some of these devices are used in rehabilitation therapy to assist in redeveloping lost nerve and muscle damage.

Some of these medical devices apply force to an appendage for exercise while other devices may detect movement and measure the force being generated by the patient. See U.S. Pat. No. 6,042,555 to Kramer et al. There are nerve stimulation devices which apply a non-injurious electrical pulse to the patient, such as disclosed in U.S. Pat. No. 4,769,881 to Pedigo et al.

Some computer simulations use gloves for the user-machine interface and detect finger movement and force. One such device is disclosed in U.S. Pat. No. 6,262,355 to Koch.

Other electrical devices are worn on the hands and give a tone or note in response to finger movement, such as U.S. Pat. No. 4,920,848 to Suzuki and U.S. Pat. No. 4,635,516 to Giannini.

Newcomer et al, U.S. Pat. No. 6,162,981, discloses a finger placement sensor for stringed instruments for instructional purposes. The sensors are integrated with a visual and aural representation of the sound produced by the sensor position.

What is needed in the art is a man-machine interface that will visually show the proper position of the subject's hands as it relates to printed music on the grand staff, and which will electrically stimulate and manipulate the subject's hands and fingers to indicate and aid the proper finger movement necessary to strike the proper keys, at the exact proper times, in the proper sequence and rhythm, and using the proper velocity, speed and timing to produce music denoted by printed music or other music source.

SUMMARY OF THE INVENTION

The approach of the instant invention is to train the hands to play songs of all levels, beginner to the most advanced. Difficult classical piano arrangements that would take 10 years to play properly can be reduced to a matter of months. The subject can be playing advanced popular songs in a matter of weeks. Under traditional teaching methods, it would take years to develop the muscle memory and the ability to coordinate mentally and physically a number of different things. The list of different things would include: learning to read sheet music, which in itself is an extensive process; hand positioning; and fingering. To read all of this information on a piece of sheet music quickly enough, position the hands in the correct area of the keys, use specific fingering, all coordinated and timed together is a task that takes years of practice. This would normally be achieved by countless hours of verbal instruction and practicing piano scales.

Accordingly, it is an objective of this invention to teach a system that gets immediate results because the interface actually moves your arms and hands left and right, up or down to the next position on the keyboard in the song and lightly pulls each finger down to play individual keys and chords. By doing all of this the system trains the arms, hands and fingers to gain the muscle memory and timing needed to play a song.

Another objective of this invention is to visually teach certain numbered hand positions on computerized sheet music to learn how open or closed to hold the hand and show the hand positions having the fingers hovering over the correct piano keys to be pressed.

A further objective of this invention is to teach a subject-playing an instrument to devote their attention to the sheet music and as a result learn to read sheet music faster by the association with what they are feeling from the interface.

Another objective of this invention is to teach the use of an interface in the form of gloves or finger sleeves connected to a controller to provide electrical stimulation to each finger to indicate proper movement in synchrony with sheet music visually presented by said controller.

BRIEF DESCRIPTION OF THE DRAWINGS

FIG. 5 shows the numbered hand positions.

DETAILED DESCRIPTION

Figure 1:
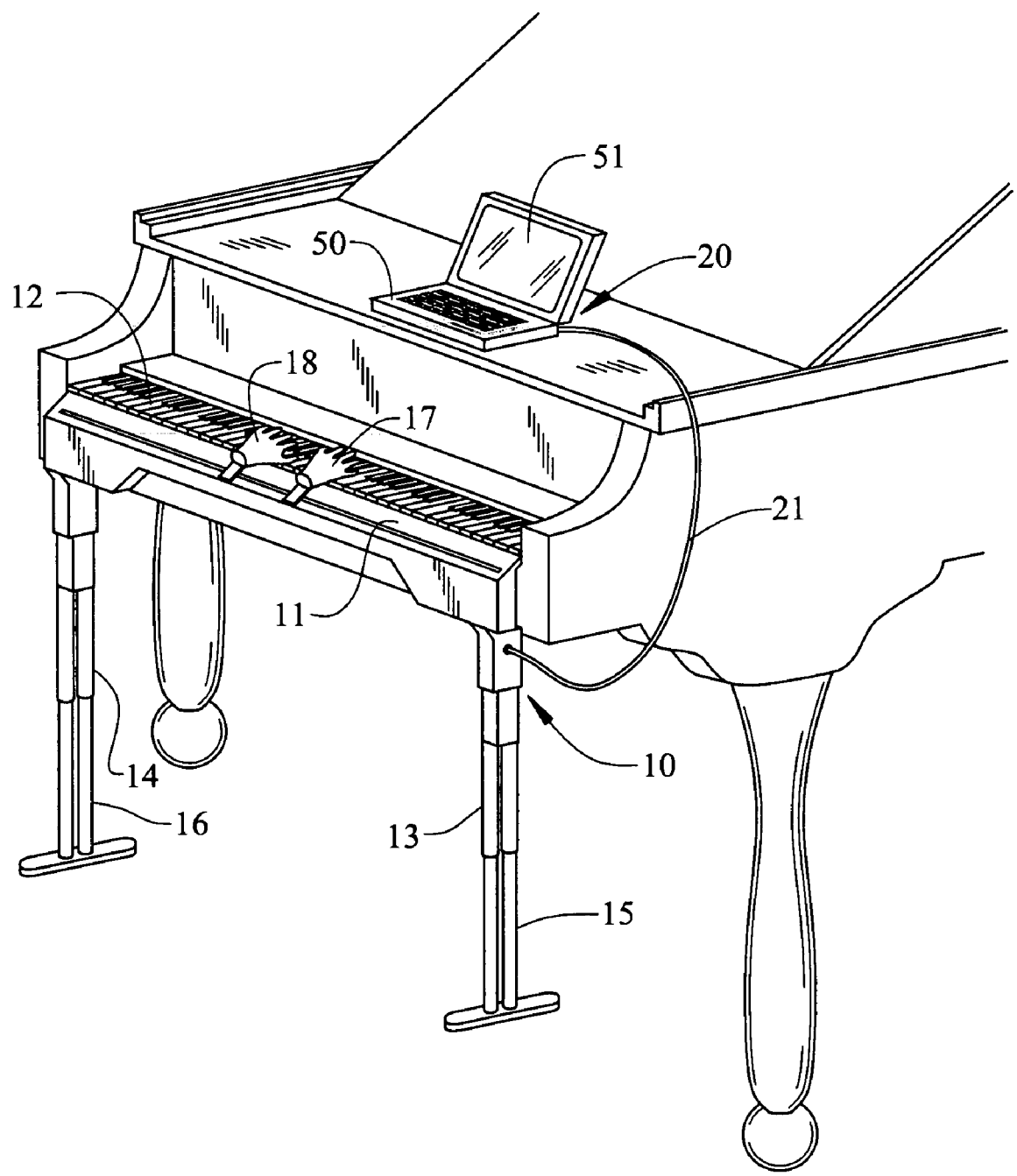
FIG. 1 is a prospective of the invention mounted for piano.

The interface 10, as shown in FIG. 1, has an elongated carriage 11 which approximates the length of the piano keyboard 12. The carriage is mounted on legs 13 and 14, one at each end of the carriage. The legs 13 and 14 are adjustable in height to accommodate pianos of different sizes. As shown, the legs have telescoping sections 15 and 16 which can be locked in place either by detent or friction grip. The carriage 11 is connected to a controller 20 by a data line 21. The data line 21 may also electrically power the carriage or a separate power cord may be used.

The controller 20 is operated by a computer 50. One of the functions of the monitor 51 is to provide a visual display of the keyboard depicted as played synchronized with a selected sound track. Another function of the monitor is to provide a depiction of sheet music, with or without hand positions. The audio circuit of the computer 50 is used to produce the proper sounds depicted visually by the monitor. The computer may have a dedicated hard drive programmed to operate the described system or the system may be on a CD with the system program and selected music.

Slidably attached to the carriage 11 are two gloves 17 and 18. The gloves move laterally along the carriage in response to commands by the controller 20. The gloves may be moved by piston rods connected to small hydraulic cylinders (not shown) or by electric potential along the carriage or magnetic forces. In one mode, the gloves are moved manually by the subject. Both gloves 17 and 18 have finger sleeves 22 and 23 for each finger of each hand. Each finger of the finger sleeves 22 and 23 has a fine electrically conductive line (not shown) fixed thereto and connected through the carriage to the controller 20. In one embodiment, the line conducts non-injurious electrical pulses to the respective finger commanded to move by the controller 20. In another embodiment, the finger sleeves 22 and 23 are powered articulated frames that gently apply bending forces to the respective fingers to engage the proper key on the keyboard. In both embodiments, the commands applied to the finger sleeves are coordinated with music depicted visually by the controller, in sheet music form or other visual representation of music.

Figure 2:
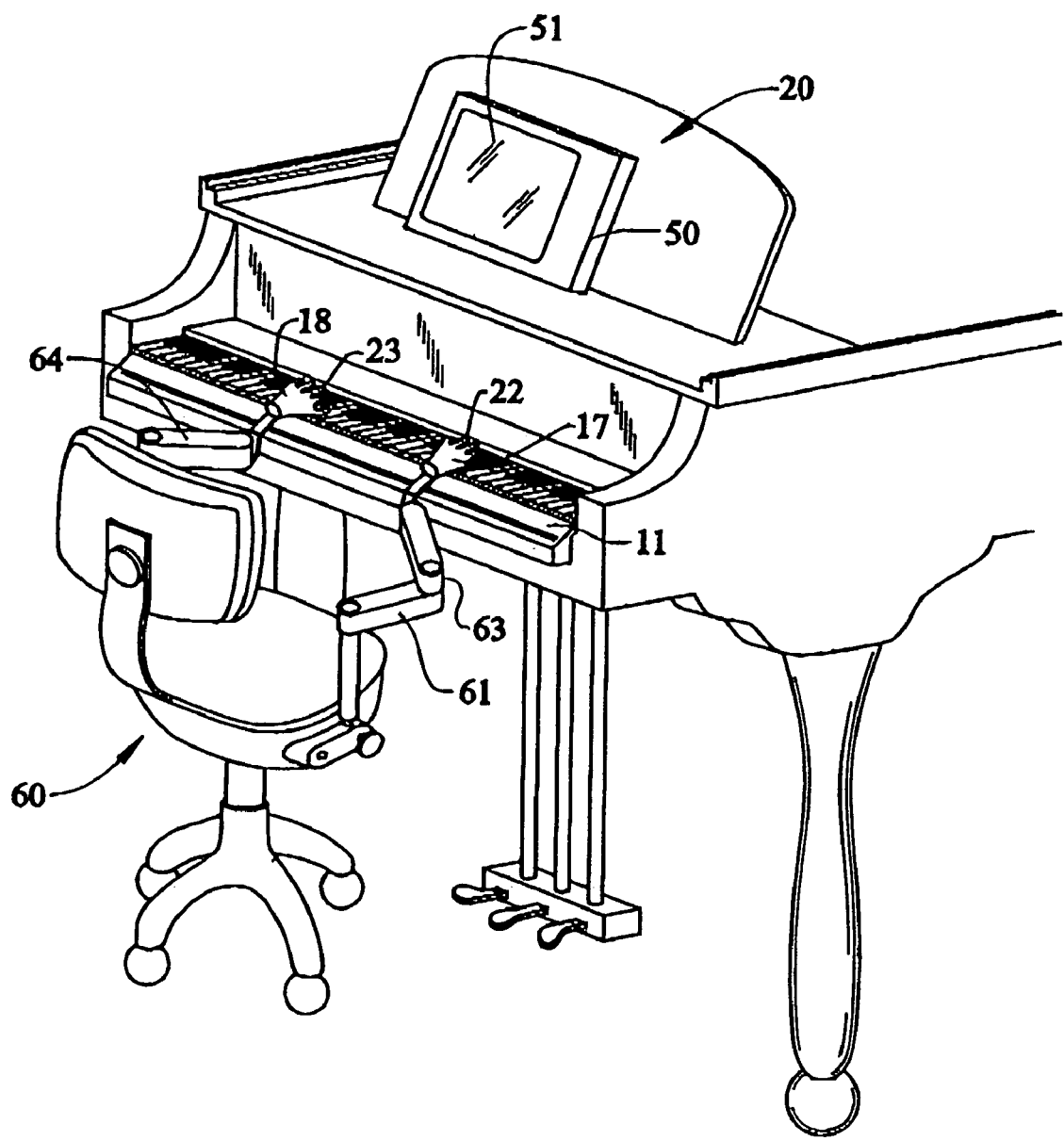
FIG. 2 is a prospective of another embodiment of the invention mounted for piano.

In FIG. 2, the carriage 11 is supported on a stool 60. The arms 61 of the stool are adjustably connected to the carriage arms 63 and 64. The height of the seat of the stool is also adjustable. The interface 10 can be attached to a conventional piano bench, as another modification.

Figure 3:
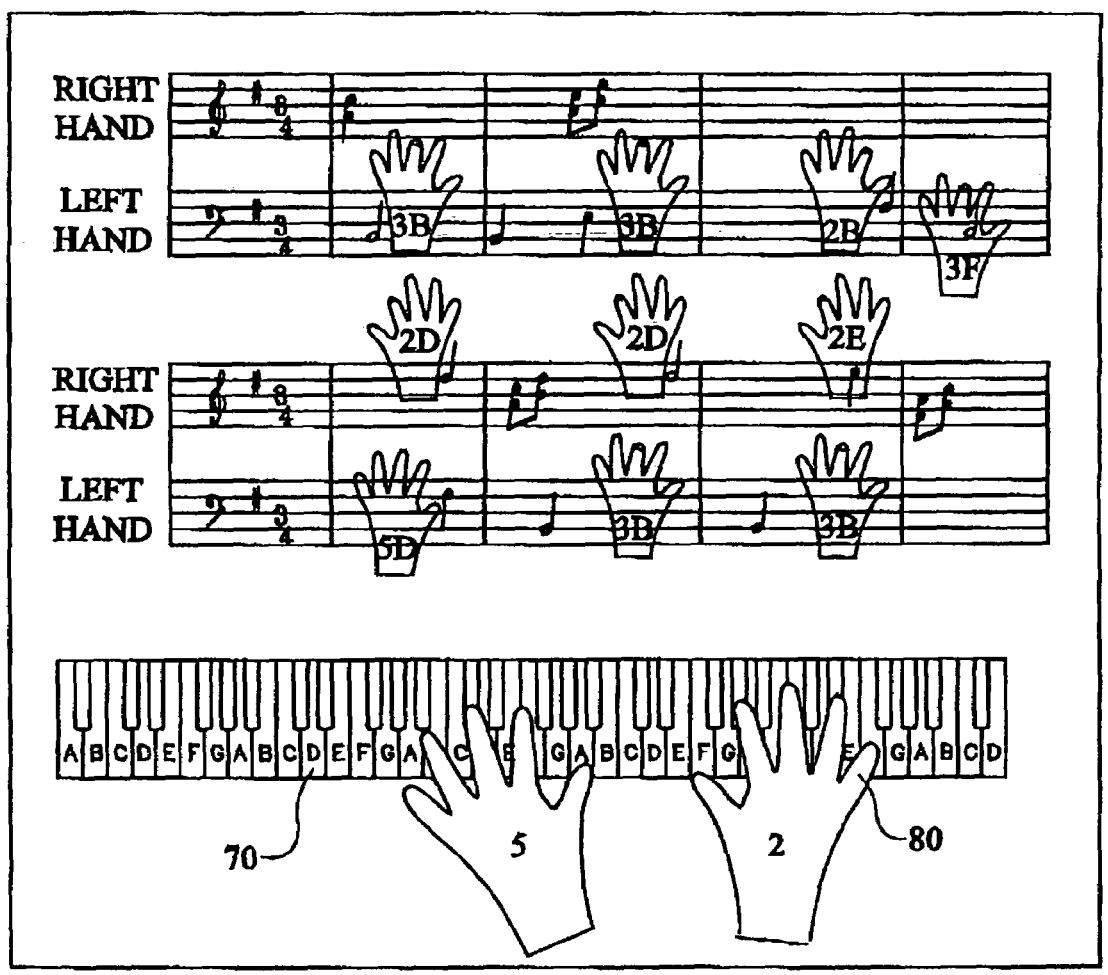
FIG. 3 is a representation of the keyboard with hand positions.

In FIG. 3 there is a representation of images produced in one mode of the computer 50 programming to illustrate the keyboard designations 70 and the hand positions 80 necessary for a particular segment of the music being played or to be played.

Figure 4:
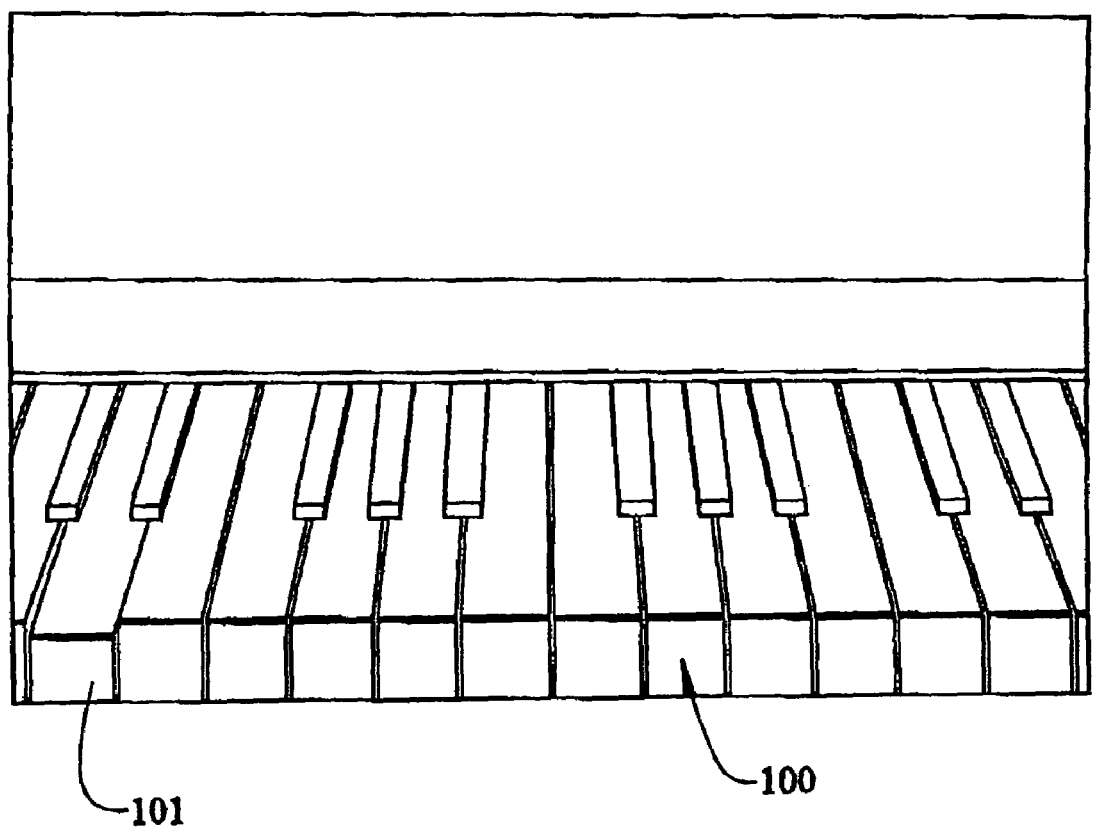
FIG. 4 is a representation of the keyboard image.

In FIG. 4, a simulated three dimensional depiction of a portion of a keyboard 100 is projected on the monitor to show the key 101 to be played for one exercise of the method.

In FIG. 5, the numbered hand positions 80 used in this method are shown on the monitor. These positions 80 are integrated with the keyboard, as shown in FIG. 3.

To use the interface system to learn to play a musical instrument, such as a piano, the following steps are recommended:

1. Attach "finger sleeves" that are marked to identify left and right hands as well as each finger.

2. Position left and right forearms in the center of each carriage.

3. Place the fingers of both hands in starting position over the white keys in the center of the keyboard. Turn out the right wrist slightly to the right and the left wrist slightly to the left, horizontally, so you can touch to the white keys, with the little finger and thumb, spreading them five keys apart.

4. By resting your forearms lightly on the concert hands carriages, you then relax your arms, shoulders, fingers and hands. Your arms will ride on the carriages stopping at the next key(s) to be played. The finer sleeves will require you to relax your fingers completely and let tie wire on each fingers. Gently pull the fingers down to lower the piano keys.

When learning a new song with the concert hands practice sections by looping (repeating) and using slow speed with the right hand first, then switch to the left hand as each hand becomes proficient or tired. If you make a mistake play through it then loop at a slower speed until that section works. Try looping at slow, medium, and fast speeds. Keep the playing fingers on the keys at all times and be careful not to over do it. If you feel like any part of your hands, arms, or body is getting tired, take a break and restart practice after some rest. The best way to increase stamina is to practice every day. Stamina must be built gradually with the concert hands.

In addition to stamina your level of playing will improve faster if you play finished pieces and make music, or practice difficult sections with each hand separately continuously. Once you find the hand positioning and fingering that's right for you and by playing a little softer the fatigue in your hands will disappear. Remember building endurance is not so much building muscle, as knowing how to relax. A loose wrist is essential for total relaxation.

Not all suggested fingering is appropriate for everyone. Find what works easiest and with the least stress. Choose one fingering and stick to it. Let the fingers do most of the playing, with the hands moving as little as possible. As you gain stamina, try getting up to speed with one hand then both hands by section then whole song as soon as you can.

Finally you should be able to play a whole song, with one or both hands at 150% of it's original speed. Practice thinking ahead of where you are in the song. Remember it's better to practice several things in one sitting, than to work too hard on just one thing.

Practice the song in your mind. Recall the song in sections of numbered hand positions. Most of the time sections will repeat. By learning 10 bars or sections of the song enables you to play 70% of the song. Another practice tip is, while practicing one section, always include the beginning of the next section. Any section may be broken up into shorter sections for practice, but sections must overlap. Practicing short sections allows you to practice the same section dozens, even hundreds of times, in a matter of minutes. Choosing short sections enables you to bring difficult sections up to speed in just minutes.

Singing or humming while you play can aid in the feel and the timing of the song. Explore various connection motions when connecting sections of a song. When you want to play softly the keys are lowered more slowly. To play louder the keys are lowered quicker. Never bang the keys. There will be a certain degree of improvement each time you play. This will vary by each persons ability in adapting to the system and how often they practice. Being creative will help you to develop your own hand, finger, timing, and other methods that you will discover in your quest to develop "concert hands".

The best way to become familiar with a new song is to listen to a performance. Memorize the sound and feeling of each section. Then when you play the song yourself, listen and be aware of every sound you produce. Now play one section of the song while listening to the original from your speakers or headphones. Ultimately you want to synchronize the entire song you are playing with the original recording.

The hand and fingers should form a dome shape in order to curve the fingers so that the finger sleeves can pull the finger tips down to the keys. After the fingers have been pulled down you will have to lift your finger up to prepare for the next pull. The reflex action of your fingers after pressing a key will do most of it if you relax your finger. Anyone can relax. Turn off the necessary muscles as soon as their job is finished. Practice relaxing your finger after a note is played. Your hands and fingers will probably have a tendency to be too rigid when you first start using the concert hands. This will not allow the finger sleeves to pull the fingers down at the right time or maybe not at all. When changing to different numbered hand positions, stretch and cup the palm of hand more so than the fingers. Try to keep the playing finger in line with the forearm as much as possible. Raising the wrist for the black keys and lowering wrist for white keys will make hand positioning easier. Experiment with different wrist angles, hand and finger positions. Find what works best for you. Difficult sections that are fast or use bigger chords can determine your chose of strong or weak fingers to use. In a scale involving black and white keys, thumb and pinky play the white keys and all other fingers play the black keys. Usually the left hand is slower in learning than the right hand. This is why slow play is an important way to reinforce hand memory. The concert hands allows you to adjust playing speeds to ⅛, ¼, ½, and full speed.

The right pedal also known as the sustain or damper pedal is depressed with the right foot. This pedal is used to continue the sound of the keys you have just released. The sound will stop when you release the pedal.

The center pedal also called the sostenuto pedal and can be depressed with either the right or left foot. This pedal sustains the keys you play while pressing the pedal, but as you release the keys and continue to hold pedal down, it will keep those keys sustained but not any other keys that are played.

The left pedal also referred to as the una corda or soft pedal is played with the left foot. This pedal is used to soften the music.

Foot positioning for pedals should be—heels kept on floor as you press pedal with ball of foot. The pedal must be played as carefully as the keys. Experiment with the pedals. Generally the pedal is depressed a split second after playing the note. Technique improves fastest without the pedal before playing the note because you hear exactly what you play without interference from previously played notes.

Bench height and distance—with the interface 10 up against the piano, place your cupped hands on the white keys little finger and thumb five keys apart. The elbows should be at the height of the keys. The distance of the bench from the piano (and your sitting position) should be such that the elbows just miss your body. Seating position on the bench should be close to the front edge of the bench.

Pedal markings on the sheet music shown on monitor 51 will highlight along with the hand position/number to indicate when to press the pedals. With most music you can get by just using the sustain (right) pedal.

A large part of your initial memory will be hand and finger memory, which comes from repeated carriage and finger sleeve movements. Hand and finger memory develop from reflex hand motion and a reflex from the sound of the piano. After playing the first note, the reflex plays the second note, which stimulates the third note etc. each time you play a song on the piano with the system, you will gradually anticipate every hand and finger movement in the song. After playing the song a number of times, you will be able to play the song without the interface 10.

The subject will remember the sequence of the keys and hand positions together with the auditory music. Keyboard memory consists of the visual memory of the hands playing the keys as well as feel memory for those sections that you play without looking at the hands. Watch the carriage 11 move your hands to each position and feel the keys that you play. Take the movements in sections and loop them until you are anticipating each position the carriage will move to. Before playing, scan the sheet music and look for repetitions of hand positions. This will enable you to plan ahead of what you are playing so that you can anticipate the hand positions/numbers that are coming next. There are only 5 hand positions used with the concert hands. Most songs will use only 2–3 hand positions.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

I claim:

1. A method of teaching a student to play the piano comprising the steps of
   (a) providing an interface device having an elongated carriage, a pair of gloves slidably mounted on said carriage, finger sleeves in each of said pair of gloves adapted to receive the fingers of a student, said finger sleeves connected to a controller, said controller commanding movement of said finger sleeves, a computer including a monitor and a sound circuit connected to said controller, said controller commands generated by computer programs,
   (b) mounting said interface adjacent a piano keyboard to register said position of said gloves on said carriage to match the position of the keys on the keyboard,
   (c) initiating said computer program, said program including a musical score,
   (d) commanding said controller to send signals to said finger sleeves to strike the key to correspond to the keyboard key necessary to play said musical score,
   (e) providing a visual representation on said monitor of the proper positioning of the hands on the keyboard necessary to play said musical score, and
   (f) providing the correct sound for said musical score shown on said monitor.

2. A method of teaching of claim 1 comprising the steps of
   (a) commanding said controller to send signals to said gloves to move along said carriage to correspond to the hand positions necessary to play said musical score.

3. A piano teaching interface for association with a piano keyboard, said interface comprising a carriage of a length approximating the length of a piano keyboard, a pair of gloves slidably attached to said carriage, each of said gloves having finger sleeves adapted to receive the fingers of a student's hands, a controller means connected to said finger sleeves for signaling said sleeves to strike a key to play a segment of a musical score and a monitor for visual display connected to said controller means, said controller means providing a visual representation of the proper portion of a keyboard and the proper keys to be struck to play a segment of a musical score.

4. A piano teaching interface of claim 3 comprising an audio circuit in said controller means for providing the proper sound for the segment of a musical score.

5. A piano teaching interface of claim 3 comprising a frame in said finger sleeves, said frame adapted to move a finger to strike a key.

6. A piano teaching interface of claim 3 comprising said gloves connected to said controller means for moving said gloves along said carriage to correspond to the proper position to play a segment of a musical score.

* * * * *